United States Patent [19]

Sakai et al.

[11] Patent Number: 5,222,758
[45] Date of Patent: Jun. 29, 1993

[54] STRUCTURE FOR SUPPORTING SUSPENSION UNIT TO VEHICLE BODY

[75] Inventors: Akito Sakai; Kunihiro Nishihara, both of Kanagawa, Japan

[73] Assignees: Nissan Motor Co., Ltd., Yokohama; Yorozu Corporation, Kanagawa, both of Japan

[21] Appl. No.: 714,309

[22] Filed: Jun. 12, 1991

[30] Foreign Application Priority Data

Jun. 12, 1990 [JP] Japan ................................. 2-154705

[51] Int. Cl.[5] .............................................. B60G 25/00
[52] U.S. Cl. ..................................... 280/673; 280/688
[58] Field of Search ............... 280/673, 781, 788, 688; 180/312

[56] References Cited

FOREIGN PATENT DOCUMENTS 34212 2/1988 Japan ................................... 280/373

OTHER PUBLICATIONS

Machine Design, Nov. 18, 1971, pp. 53 and 69.

Primary Examiner—Kenneth R. Rice
Attorney, Agent, or Firm—Pennie & Edmonds

[57] ABSTRACT

A structure for supporting a vehicle suspension unit to a floor panel of a vehicle includes a rear side member secured to a longitudinally extending side portion of the floor panel and a rear cross member secured to a laterally extending portion of the floor panel. The rear cross member has at a side end portion thereof an opening. A collar has a through bore mated with the opening. An upper reinforcing member is secured to the collar, the rear side member and the rear cross member. A lower reinforcing member is secured to the collar and the rear cross member. A suspension supporting bolt has a serrated portion which is so sized as to fit into the through bore of the collar. The suspension supporting bolt is secured to the collar by thrusting the serrated portion into the through bore of the collar. The suspension supporting bolt passes through the collar and the opening and is secured to the vehicle suspension unit.

12 Claims, 3 Drawing Sheets

STRUCTURE FOR SUPPORTING SUSPENSION UNIT TO VEHICLE BODY

BACKGROUND OF THE INVENTION

1. Field of the Invention

The present invention relates in general to structures for supporting a suspension unit to a vehicle body, and more particularly to structures for connecting suspension supporting bolts to the vehicle body.

2. Description of the Prior Art

Hitherto, various structures for connecting suspension supporting bolts to the vehicle body have been proposed and put into practical use. However, some of them have failed to exhibit a satisfied rigidity for connecting suspension supporting bolts to the vehicle body due to their inherent constructions. As is known, if the rigidity is poor, undesirable differential noise, road noise and the like tend to be produced during the movement of the vehicle.

SUMMARY OF THE INVENTION

It is therefore an object of the present invention to provide a structure for connecting suspension supporting bolts to the vehicle body, which can exhibit satisfied rigidity.

According to the present invention, there is provided a structure for connecting suspension supporting bolts to the vehicle body, which is light in weight and constructed with low cost.

According to a first aspect of the present invention, there is provided a structure for supporting a vehicle suspension unit to a floor panel of a vehicle, the structure comprising: a side member secured to a longitudinally extending side portion of the floor panel; a cross member secured to a laterally extending portion of the floor panel; means for defining an opening in one of the side member and the cross member; a collar having a through bore mated with the opening; a first reinforcing member secured to the collar and at least one of the side and cross members; and a suspension supporting bolt having a serrated portion which is so sized as to fit into the through bore of the collar, the suspension supporting bolt being secured to the collar by thrusting the serrated portion into the through bore of the collar, the suspension supporting bolt passing through the collar and the opening and being secured to the vehicle suspension unit.

According to a second aspect of the present invention, there is provided a structure for supporting a vehicle suspension unit to a vehicle body, the structure comprising: means for defining an opening at the vehicle body; a collar having a through bore mated with the opening, the collar being secured to the vehicle body; and a suspension supporting bolt having a serrated portion which is so sized as to fit into the through bore of the collar, the suspension supporting bolt being secured to the collar by thrusting the serrated portion into the through bore of the collar, the suspension supporting bolt passing through the collar and the opening and being secured to the vehicle suspension unit.

According to a third aspect of the present invention, there is provided a structure for supporting a vehicle suspension unit to a vehicle body, the structure comprising: means for defining an opening at the vehicle body; a collar having a through bore mated with the opening, the collar being secured to the vehicle body; and a suspension supporting bolt fixedly secured to the collar, the suspension supporting bolt passing through the collar and the opening and being secured to the vehicle suspension unit.

BRIEF DESCRIPTION OF THE DRAWINGS

Other objects of the present invention will become apparent from the following description when taken in conjunction with the accompanying drawings, in which.

DETAILED DESCRIPTION OF THE INVENTION

FIGS. 1, 2, 4 and 5 show an embodiment of the present invention.

Figure 1:
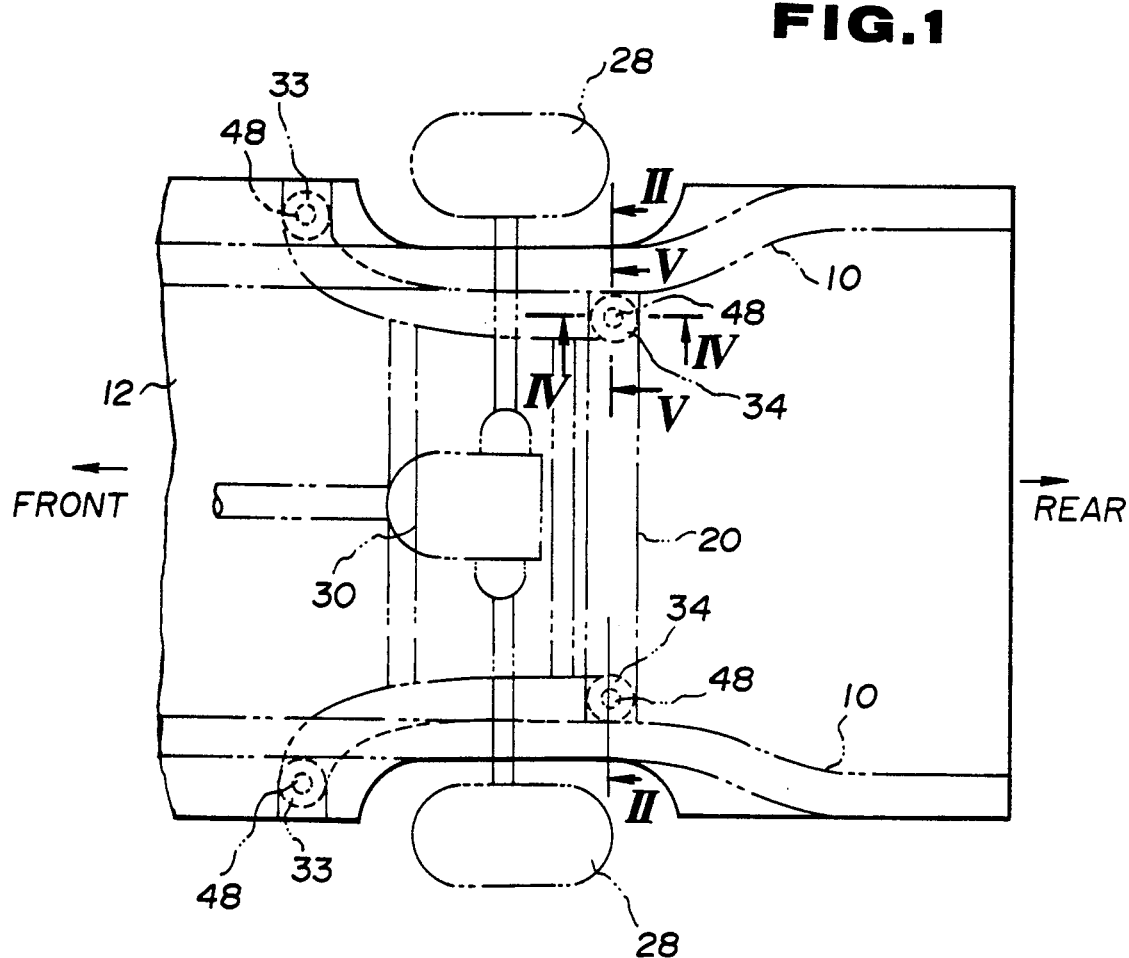
FIG. 1 is a schematic plan, but partially cut away, view of a rear part of a vehicle, to which the present invention is practically applied.
Figure 2:
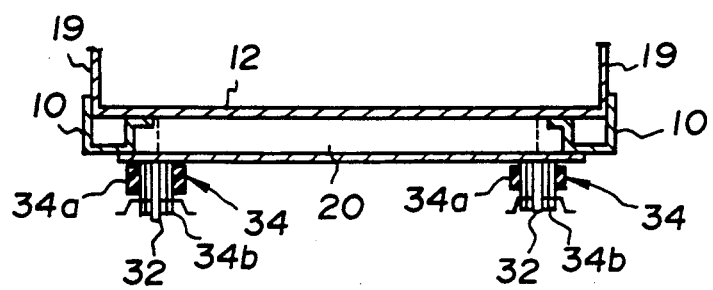
FIG. 2 is a sectional view taken along the line II—II of FIG. 1.
Figure 5:
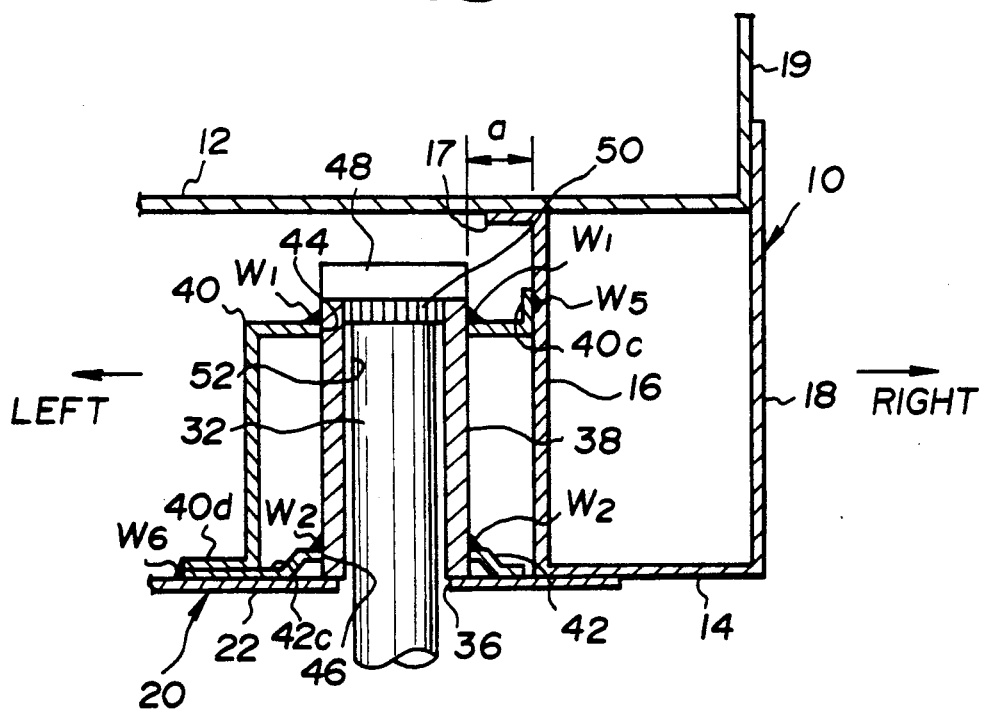
FIG. 5 is an enlarged sectional view taken along the line V—V of FIG. 1.

As is seen from FIGS. 1, 2 and 5, rear side members 10 of the vehicle body have each a generally channel structure. They extend longitudinally and are secured to side portions of a floor panel 12.

As is clearly shown in FIG. 5, each rear side member 10 comprises a horizontal bottom wall portion 14, an inner vertical wall portion 16 and an outer vertical wall portion 18 which are combined to constitute the channel structure. The inner vertical wall portion 16 has at its upper end an inwardly extending horizontal flange 17 secured to a bottom surface of the floor panel 12. The outer vertical wall portion 18 is secured at its upper end portion to an inner vertical wall 19 of a wheel house (not shown) which is united with the floor panel 12.

Figure 4:
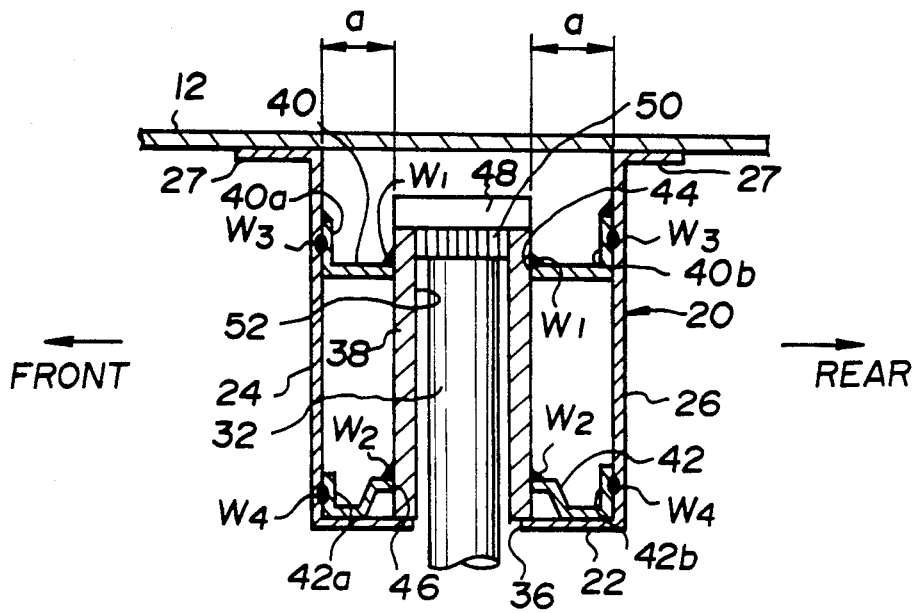
FIG. 4 is an enlarged sectional view taken along the line IV—IV of FIG. 1.

As is seen from FIGS. 1, 2, and 4, a rear cross member 20 having a generally channel structure is laterally extended and secured to the bottom surface of the floor panel 12.

As is seen from FIG. 4, the rear cross member 20 comprises a horizontal bottom wall portion 22, a front vertical wall portion 24 and a rear vertical wall portion 26 which are combined to constitute the channel structure. The front and rear vertical wall portions 24 and 26 have respectively horizontal flanges 27 which are extended in the opposite direction and secured to the bottom surface of the floor panel 12.

The rear cross member 20 is welded at its longitudinal both sides to the rear side members 10 in the following manner.

The front and rear vertical wall portions 24 and 26 of the rear cross member 20 have at longitudinal ends thereof forwardly and rearwardly extending flanges (not shown), respectively. The flanges are welded to the inner vertical wall portion 16 of the rear side member 10. The horizontal bottom wall portion 22 of the rear cross member 20 is outwardly extended and welded to the bottom surface of the horizontal bottom wall portion 14 of the rear side members 10 (see FIG. 5).

Figure 3:
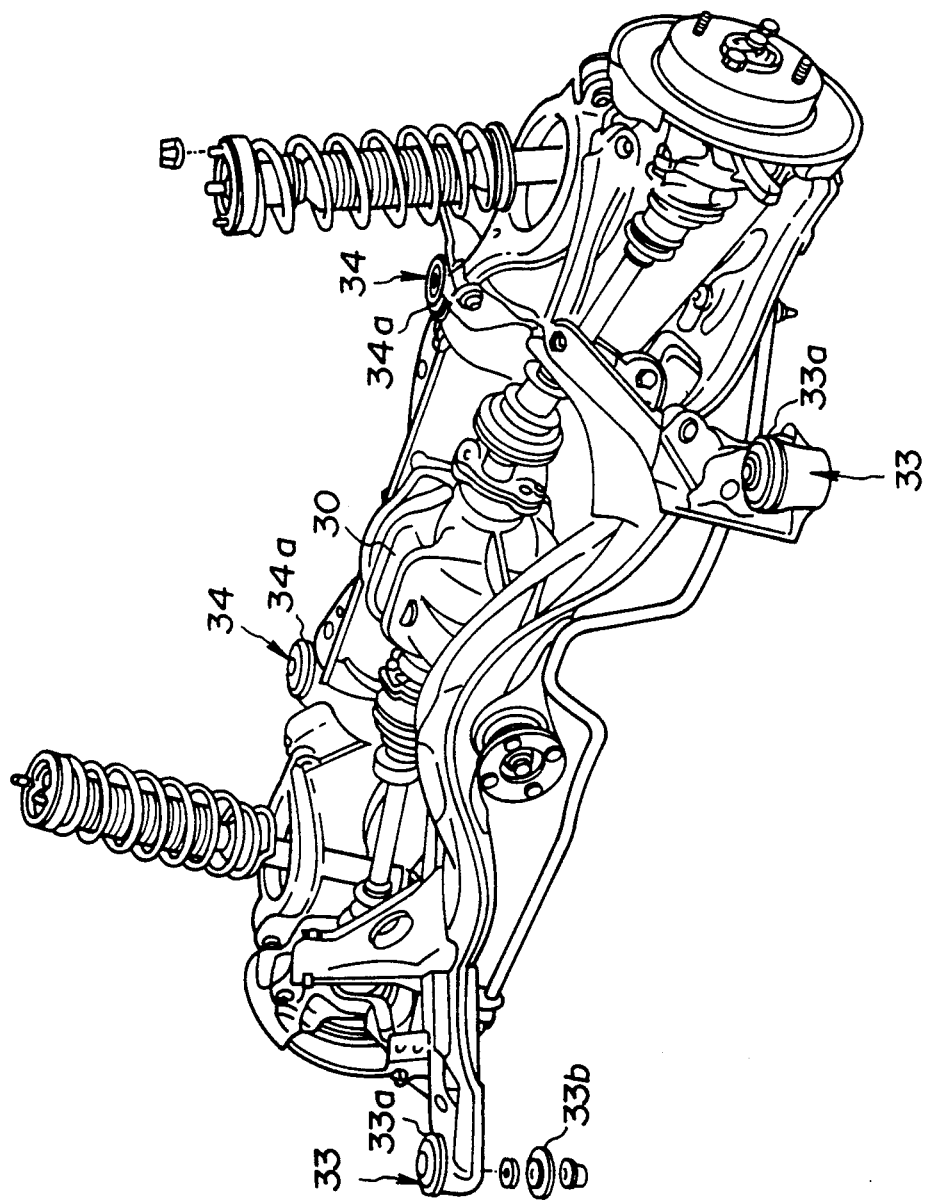
FIG. 3 is a perspective view of a rear suspension unit.

As is seen from FIGS. 1 and 3, designated by numerals 28 and 30 are a pair of road wheels and a differential gear, respectively.

FIG. 3 shows a rear suspension unit which is to be supported by the floor panel 12 through four suspension supporting bolts 32. The suspension unit is illustrated with the differential gear 30 mounted thereon.

As shown, the suspension unit has two front supported portions 33 and two rear supported portions 34, each supported portion including an elastomeric bush 33a or 34a and a connecting nut 33b or 34b.

As will become apparent as the description proceeds, the front and rear suspension supporting bolts 32 extend downward from the vehicle floor 12 and respectively engage with the front and rear supported portions 33 and 34 to achieve a tight connection of the suspension unit relative to the floor panel 12.

The two rear suspension supporting bolts 32 are incorporated with both the rear side members 10 and the rear cross member 20 in the following manner.

As is seen from FIGS. 4 and 5, the rear cross member 20 has at longitudinal end portions of the horizontal bottom wall portion 22 thereof two circular openings 36 for receiving the suspension supporting bolts 32. Two collars 38 constructed of rigid metal are disposed on the horizontal bottom wall portion 22 of the rear cross member 20 and respectively mated with the circular openings 36.

As is seen from FIG. 4, each collar 38 is fixedly secured to the front and rear vertical wall portions 24 and 26 of the rear cross member 20 through upper and lower reinforcing members 40 and 42. The upper and lower reinforcing members 40 and 42 have aligned circular openings 44 and 46 through which each collar 38 passes. The upper and lower reinforcing members 40 and 42 are secured at the peripheries of the circular openings 44 and 46 to the collar 38 by means of gas welding $W_1$ and $W_2$ and at front and rear vertical flanges 40a, 40b, 42a and 42b thereof to the front and rear vertical wall portions 24 and 26 of the rear cross member 20 by means of spot welding $W_3$ and $W_4$, respectively.

As is seen from FIG. 5, each collar 38 is fixedly secured to the inner vertical wall portion 16 of the rear side member 10 and to the horizontal bottom wall portion 22 of the rear cross member 20 through the upper and lower reinforcing members 40 and 42. The upper reinforcing member 40 is secured at an outer vertical flange 40c thereof to the inner vertical wall portion 16 of the rear side member 10 by means of spot welding $W_5$ and at an inner horizontal flange 40d thereof to the horizontal wall portion 22 of the rear cross member 20 together with an inner horizontal flange 42c of the lower reinforcing member 42 by means of gas welding $W_6$.

As is seen from FIGS. 4 and 5, the collar 38 is spaced away from the front and rear vertical wall portions 24 and 26 of the rear cross member 20 and from the inner vertical wall portion 16 of the rear side member 10 so as to have a clearance "a" therebetween. The clearance "a" is so determined as to permit insertion of a welding finger of a spot-welding machine thereinto. However, the clearance "a" should be as small as possible for achieving a rigid connection of the collar 38 relative to the rear cross and side members 20 and 10.

Each suspension supporting bolt 32 is formed at its upper end with a circular bolt head 48 of which diameter is substantially the same as the outer diameter of the collar 38. The suspension supporting bolt 32 has a serrated portion 50 below the bolt head 48. The serrated portion 50 is so sized as to fit into a through bore 52 of the collar 38. The suspension supporting bolt 32 is thrusted into the bore 52 of the collar 38 from above, so that upon completion of the insertion, the serrated portion 50 is non-rotatably and fixedly engaged with the upper wall of the bore 52. Thus, the suspension supporting bolt 32 is non-rotatably and fixedly secured to the collar 38. The bolt head 48 of the suspension supporting bolt 32 is disposed on the collar 38, and the circular side surface of the bolt head 48 is flush with the outer cylindrical surface of the collar 38.

The suspension supporting bolt 32 extends downward from the rear cross member 20, passes through the elastomeric bush 34a of the rear supported portion 34 of the suspension unit and operatively engages with the connecting nut 34b. With this, the suspension unit is secured to the floor panel 12.

In the above-mentioned embodiment, the suspension supporting bolts 32 are described to be received in the openings 36 formed in the rear cross member 20. However, if desired, the suspension supporting bolts 32 may be received in openings which are formed in the rear side members 10.

Advantages of the structure for connecting the suspension supporting bolts 32 to the vehicle body of the present invention will be described in the following.

Since the suspension supporting bolts 32 can be positioned very close to the inner vertical wall portion 16 of the rear side member 10 and the front and rear vertical wall portions 24 and 26 of the rear cross member 20, the rigidity with which the structure supports the suspension supporting bolts 32 is enhanced.

Since the collars 38 are secured to the rear cross and side members 20 and 10 through the two reinforcing members 40 and 42, the rigidity with which the structure supports the suspension supporting bolts 32 is enhanced.

Since the suspension bolts 32 are secured to the collars 38 through the serrated portions 50 without using other separate members, the structure for supporting suspension bolts 32 can be light in weight and constructed with low cost.

What is claimed is:

1. A structure for supporting a vehicle suspension unit to a floor panel of a vehicle which has a longitudinally extending side portion and a laterally extending portion, said structure comprising:
   a side member secured to the longitudinally extending side portion of said floor panel;
   a cross member secured to the laterally extending portion of said floor panel;
   an opening formed in said cross member;
   a collar having a through bore collinearly aligned with said opening;
   a first reinforcing member secured to said collar and at least one of said side and cross members; and
   a suspension supporting bolt having a serrated portion which is so sized as to fit into said through bore of said collar, said suspension supporting bolt being fixedly secured to said collar at said serrated portion so that there can be no relative movement between said bolt and said collar, said suspension supporting bolt passing through said collar and said opening for securing to said vehicle suspension unit.

2. A structure as claimed in claim 1, in which said first reinforcing member is secured to said collar, said side member and said cross member.

3. A structure as claimed in claim 2, further comprising a second reinforcing member which is positioned adjacent said opening and secured to said collar and said cross member, said second reinforcing member being spaced from said first reinforcing member in a longitudinal direction of said collar.

4. A structure as claimed in claim 3 in which said suspension supporting bolt has a bolt head at one end thereof adjacent said serrated portion, said bolt head being disposed collinearly with said collar and having a diameter which is substantially the same as an outer diameter of said collar.

5. A structure as claimed in claim 4, in which said side member has a generally channel structure and comprises a first horizontal bottom wall portion, an inner vertical wall portion and an outer vertical wall portion, in which said cross member has a generally channel structure and comprises a second horizontal bottom wall portion, a front vertical wall portion and a rear vertical wall portion, and in which said opening is defined at said second horizontal wall portion of said cross member.

6. A structure as claimed in claim 5, in which said first and second reinforcing members respectively have circular openings for receiving said collar therethrough.

7. A structure as claimed in claim 6, in which said first and second reinforcing members are secured, at the peripheries of said circular openings to said collar by means of gas welding and secured at front and rear vertical flanges thereof to said front and rear vertical wall portions of said cross member by means of spot welding, and in which said first reinforcing member is secured at an outer vertical flange thereof to said inner vertical wall portion of said side member by means of spot welding and at a first inner horizontal flange thereof to said horizontal wall portion of said cross member together with a second inner horizontal flange of said second reinforcing member by means of gas welding.

8. A structure as claimed in claim 7, in which said collar is spaced away from said front and rear vertical wall portions of said cross member and from said inner vertical wall portion of said side member so as to have a certain clearance therebetween for permitting insertion of a welding finger for said spot welding.

9. A structure for supporting a vehicle suspension unit to a vehicle body, said structure comprising:
   an opening formed at said vehicle body;
   a collar having a through bore collinearly aligned with said opening and fixedly secured to said vehicle body;
   a suspension supporting bolt having a serrated portion which is so sized as to fit into said through bore of said collar, said suspension supporting bolt being fixedly secured to said collar at said serrated portion so that there can be no relative movement between said bolt and said collar, said suspension supporting bolt passing through said collar and said opening for securing to said vehicle suspension unit.

10. A structure for supporting a vehicle suspension unit to a vehicle body, said structure comprising:
    an opening formed at said vehicle body;
    a collar having a through bore collinearly aligned with said opening and fixedly secured to said vehicle body;
    a suspension supporting bolt fixedly secured to an inner end of the through bore of said collar so that there can be no relative movement between said bolt and said collar, said suspending supporting bolt coaxially extending through said collar and said opening, and having a threaded suspension attachment portion protruding beyond said collar.

11. A structure as claimed in claim 10, further comprising a connecting nut which is threadedly engaged with the threaded suspension attachment portion of said suspension supporting bolt for detachably securing the vehicle suspension unit to said suspension supporting bolt.

12. A structure as claimed in claim 10, in which said suspension supporting bolt extends in a substantially vertical and downward direction.

* * * * *